(12) United States Patent
Vernia et al.

(10) Patent No.: US 10,505,820 B2
(45) Date of Patent: Dec. 10, 2019

(54) USER INTERFACE WITH AN EXPANDABLE NAVIGATION TREE

(71) Applicant: Red Hat Israel, Ltd., Raanana (IL)

(72) Inventors: Lior Vernia, Tel-Aviv (IL); Livnat Peer, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 687 days.

(21) Appl. No.: 14/188,577

(22) Filed: Feb. 24, 2014

(65) Prior Publication Data

US 2015/0242079 A1     Aug. 27, 2015

(51) Int. Cl.
*H04L 12/24*     (2006.01)
*G06F 3/0482*    (2013.01)

(52) U.S. Cl.
CPC ............ *H04L 41/22* (2013.01); *G06F 3/0482* (2013.01)

(58) Field of Classification Search
CPC ....... G06F 3/0484; G06F 3/0482; H04L 41/22
USPC .......................................................... 715/853
See application file for complete search history.

(56) References Cited

U.S. PATENT DOCUMENTS

| | | | |
|---|---|---|---|
| 5,923,328 A * | 7/1999 | Griesmer | G06F 3/0481 715/769 |
| 6,108,698 A | 8/2000 | Tenev et al. | |
| 6,462,762 B1 * | 10/2002 | Ku | G06F 16/168 715/853 |
| 2002/0016794 A1 * | 2/2002 | Keith, Jr. | G06F 17/30327 |
| 2004/0169688 A1 | 9/2004 | Burdick et al. | |
| 2005/0188295 A1 * | 8/2005 | Konkus | G06F 3/0482 715/206 |
| 2006/0184892 A1 * | 8/2006 | Morris | G06F 16/94 715/767 |

FOREIGN PATENT DOCUMENTS

| | | |
|---|---|---|
| WO | WO 2000042497 A1 | 7/2000 |
| WO | WO 2002019054 A2 | 3/2002 |

OTHER PUBLICATIONS

"Set the Navigation Pane Tree to Automatically Expand in Windows 7" (Lori Kaufman, Jan. 6, 2012 pp. 1-6).*
"Set the Navigation Pane Tree to Automatically Expand in Windows 1" (Lori Kaufman, Jan. 6, 2012 pp. 1-6).*
Burch et al., "Trees in a Treemap: Visualizing Multiple Hierarchies," Catholic Univ. Eichstätt (Germany), Published Jan. 16, 2006, http://proceedings.spiedigitallibrary.org/proceeding.aspx?articleid=728219.
Eick et al., "Navigating Large Networks with Hierarchies," AT&T Bell Lab., USA, Published Oct. 29, 1993, http://ieeexplore.ieee.org/xpl/login.jsp?tp=&arnumber=398870&url=http%3A%2F%2Fieeexplore.ieee.org%2Fxpls%2Fabs_all.jsp%3Farnumber%3D398870.
Farkas et al., "Guidelines for Designing Web Navigation," Society for Technical Communication, Published Aug. 2000, http://www.ingentaconnect.com/content/stc/tc/2000/00000047/00000003/art00007.

* cited by examiner

*Primary Examiner* — Sherrod L Keaton
(74) *Attorney, Agent, or Firm* — Womble Bond Dickinson (US) LLP; Daniel E. Ovanezian

(57) ABSTRACT

A graphical user interface (GUI) may be provided. The GUI may include a navigation tree in a first portion and a link in a second portion. The navigation tree may include multiple nodes. A selection of the link in the section portion may be received. In response to the selection of the link, the navigation tree in the first portion may be expanded to a hierarchical level displaying the node corresponding to the selected link.

8 Claims, 7 Drawing Sheets

USER INTERFACE WITH AN EXPANDABLE NAVIGATION TREE

TECHNICAL FIELD

Aspects of the disclosure generally relate to a user interface and, more specifically, relate to a user interface with an expandable navigation tree.

BACKGROUND

A navigation tree may include multiple entries or nodes organized in a hierarchical structure. For example, the navigation tree may include a first hierarchical level that is referred to as a root level of the navigation tree and a second hierarchical level including entries or nodes may be organized beneath the root level. A user may navigate through the hierarchical structure of the navigation tree to find a particular entry or node by clicking on various entries or nodes in the navigation tree.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
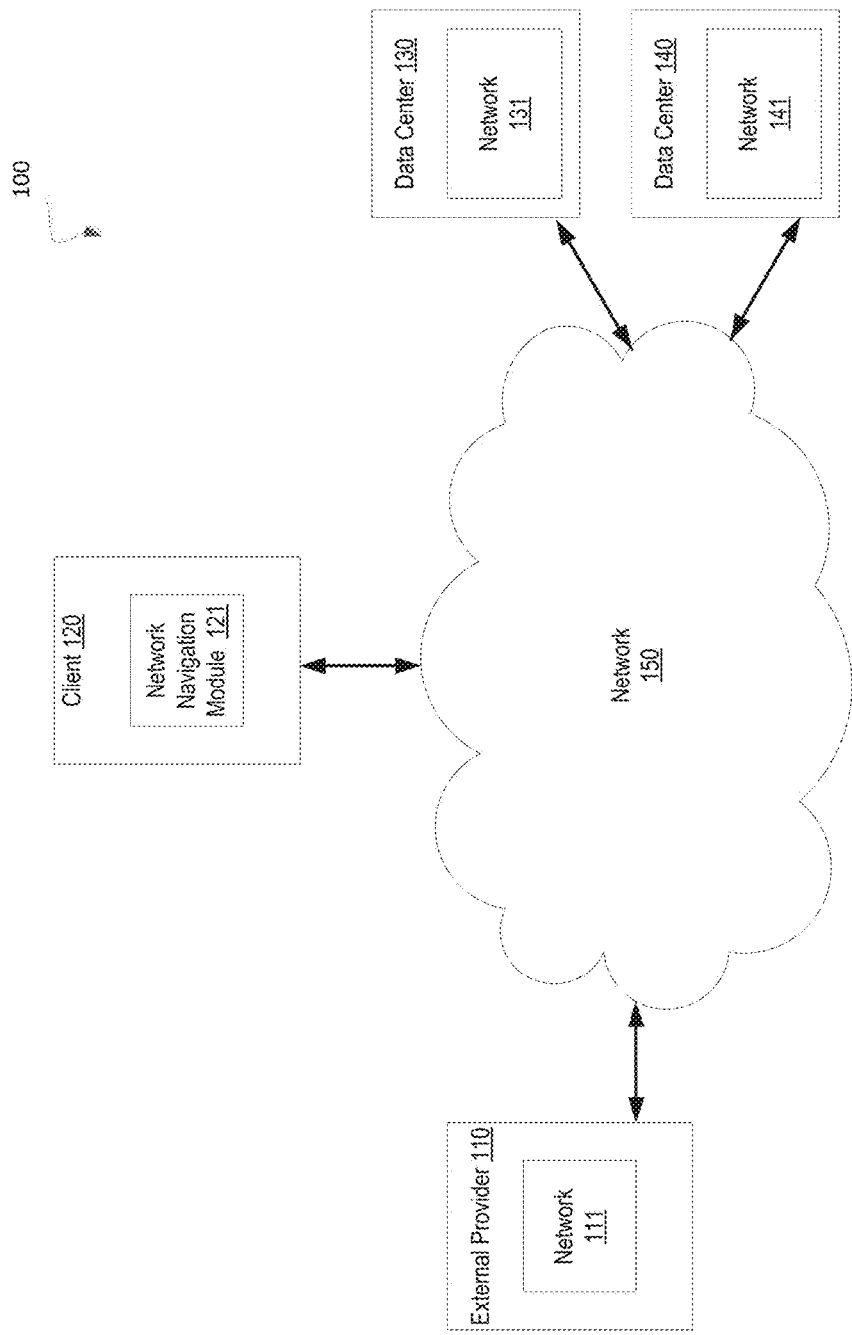
FIG. 1 illustrates an example system architecture in which embodiments of the disclosure may operate.

Embodiments of the disclosure relate to a navigation module to expand a navigation tree to a selected node in a graphical user interface associated with networks of multiple data centers and external providers. A data center may provide multiple elements (e.g., logical networks, virtual machines, storage domains, clusters, hosts, etc.). The graphical user interface may include a navigation tree that displays elements of multiple data centers.

In some embodiments, a data center may refer to a logical entity that defines a set of resources or elements. For example, the data center may be considered a container resource that contains or includes elements such as logical resources (e.g., clusters), network resources (e.g., logical networks and physical network interfaces), and storage resources (e.g., storage domains). Clusters may refer to groups of host computing systems (e.g., servers) that may provide a virtual machine. Logical networks may refer to network connections of the data center, such as network interface cards of host computing systems and virtual network interface cards of virtual machines of the host computing systems. Hosts or host computing systems may refer to physical servers on which virtual machines run. Furthermore, storage domains may refer to storage or virtual disks for the virtual machines. In some embodiments, an entry or node as used herein may refer to any of the above-referenced components or elements of a data center. For example, an entry or node of a navigation tree may refer to a cluster, a logical network, a virtual machine, a storage domain, etc. Furthermore, an external provider may provide such components or elements and such components or elements of an external provider may be assigned to a data center. For example, a network provided by an external provider may be assigned to a particular data center that represents a container resource.

A user may utilize a graphical user interface (GUI) to navigate through a navigation tree including a hierarchical structure of entries or nodes. In some embodiments, the entries or nodes may correspond to networks that are provided by the data centers and external network providers. For example, in order to find a specific network in the graphical user interface, the user may need to manually traverse through multiple hierarchical levels of the navigation tree. However, such manual navigation through the navigation tree may not be efficient and may not provide the user with contextual information to assist in the navigation through the navigation tree to a particular network or other such component of a data center or external network provider.

In some embodiments, a navigation module may provide a more efficient navigation to nodes or entries of the navigation tree. For example, the navigation module may provide or display a graphical user interface that includes a navigation tree and one or more links corresponding to specific entries or nodes. A user may select a link in the graphical user interface to expand the navigation tree to an entry or node corresponding to the link. Thus, the selection of the link in the graphical user interface may expand multiple hierarchical levels of the navigation tree based on the entry or node corresponding to the link.

FIG. 1 is an example system architecture 100 for various implementations of the disclosure. The system architecture 100 may include a client or administrator system 120, data center 130, data center 140, and an external provider 110 that are coupled via a network 150. The network 150 may be a public network (e.g., the Internet), a private network (e.g., a local area network (LAN) or a wide area network (WAN)), or a combination thereof. Network 120 may include a wireless infrastructure, which may be provided by one or multiple wireless communications systems, such as a wireless fidelity (WiFi) hotspot connected with the network 150 and/or a wireless carrier system that may be implemented using various data processing equipment, communication towers, etc.

Data centers 130 and 140 may include multiple components as previously described. For example, each of the data centers 130 and 140 may include one or more networks 131 and 141. Furthermore, the external provider 110 may further include one or more components. For example, the external provider 110 may also include one or more networks 111. In some embodiments, the network may include multiple hosts or server systems 130 running multiple virtual machines. In the same or alternative embodiments, a network may be associated with a networking layer that is applied to hot systems or server systems in a cluster of a data center. Examples of networks include, but are not limited to, data networks, storage networks, and virtual machine display networks.

Furthermore, the client system 120 may be accessed by a user (e.g., a system administrator) to manage resources or components of the data centers 130 and 140 and the external provider 110. Client system 120 may be any computing device (e.g., a server machine, a router, a personal computer, a mobile device, etc.) that may represent a user device or a server which can be, for example, a host controller managing multiple virtual machines hosted by different server systems 130 in a data center. For example, a user of the administrator system 120 may use a graphical user interface provided by a navigation module 121 that may be used to view components or resources of data centers and external providers. For example, the graphical user interface may be used to select and view configuration properties of networks of the data centers or external providers.

Figure 2:
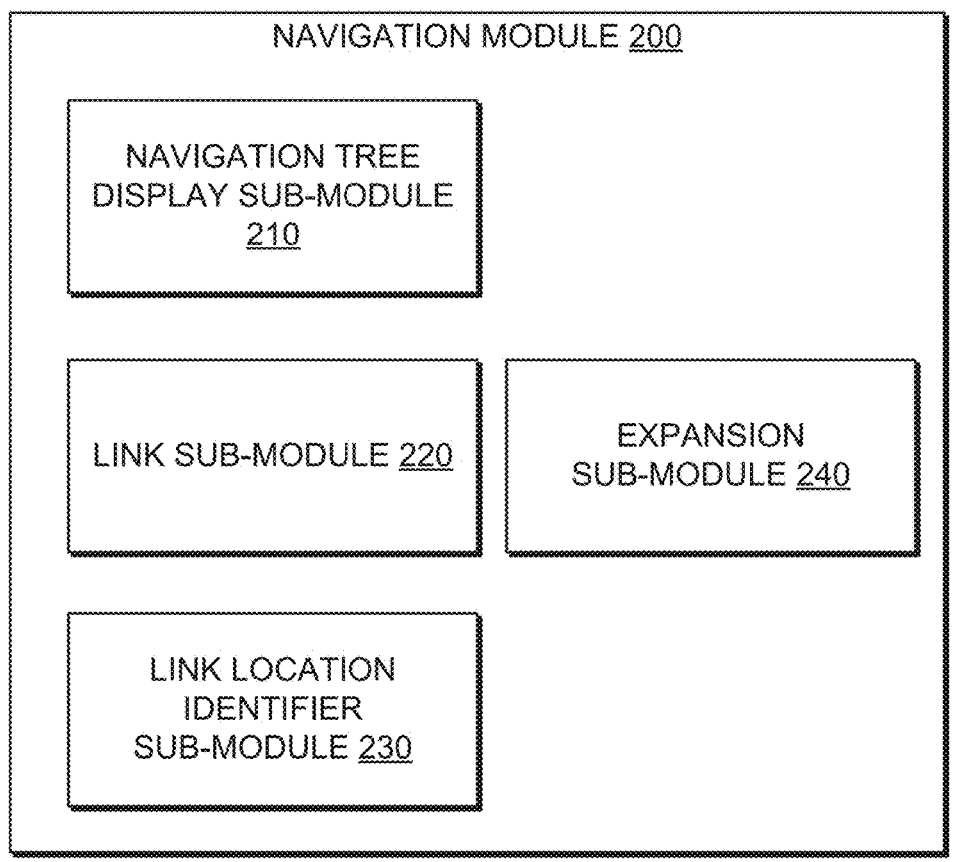
FIG. 2 is a block diagram of an example navigation module in accordance with some embodiments of the disclosure.

FIG. 2 illustrates an example navigation module 200 in accordance with some embodiments of the disclosure. In general, the navigation module 200 may correspond to the navigation module 121 of FIG. 1. The navigation module 200 may include a navigation tree display sub-module 210, a link sub-module 220, a link location identifier sub-module 230, and an expansion sub-module 240. In alternative embodiments, the functionality of one or more of the sub-modules may be combined or divided.

As shown in FIG. 2, the navigation module 200 may include a navigation tree display sub-module 210. In some embodiments, the navigation tree display sub-module 210 may display one or more hierarchical levels of a navigation tree. In the same or alternative embodiments, the navigation tree display sub-module 210 may display or provide a navigation tree that includes multiple entries or nodes organized in multiple hierarchical levels. Each of the entries or nodes of the navigation tree may correspond to a resource or component of a data center or external provider. For example, each entry or node may represent a network that is provided by a data center or an external provider. In some embodiments, the navigation tree may include a first hierarchical level that is also referred to as a root node or root level. Entries or nodes may be organized under the root level. Furthermore, additional entries or additional nodes may be organized in a second hierarchical level under the entries or nodes that are organized under the root level. Additional hierarchical levels of entries and nodes may be organized under the second hierarchical level. For example, an entry or node may be located in a third hierarchical level that is organized under another entry or node located in a second hierarchical level. The entry or node in the second hierarchical level may be referred to as a parent node of the entry or node in the third hierarchical level.

Returning to FIG. 2, the navigation module 200 may include a link sub-module 220. In some embodiments, the link sub-module 220 may display or provide one or more links that correspond to entries or nodes that are present in the navigation tree. For example, the link sub-module 220 may display or provide links representing networks of data centers or external providers. In some embodiments, the link sub-module 220 may display the links in a portion of a graphical user interface as further disclosed with relation to FIGS. 4-5.

The navigation module 200 may further include an expansion sub-module 240. In some embodiments, the expansion sub-module 240 may expand the navigation tree displayed by the navigation tree sub-module 210. For example, the expansion sub-module 240 may expand the navigation tree in response to a user selection of a link that is provided by the link sub-module 220. In some embodiments, the expansion sub-module 240 may expand the navigation tree to a hierarchical level that includes an entry or node corresponding to the link that is selected by a user. Further details with regard to expanding a navigation tree in response to a selection of a link are disclosed with relation to FIGS. 4-5.

Figure 3:
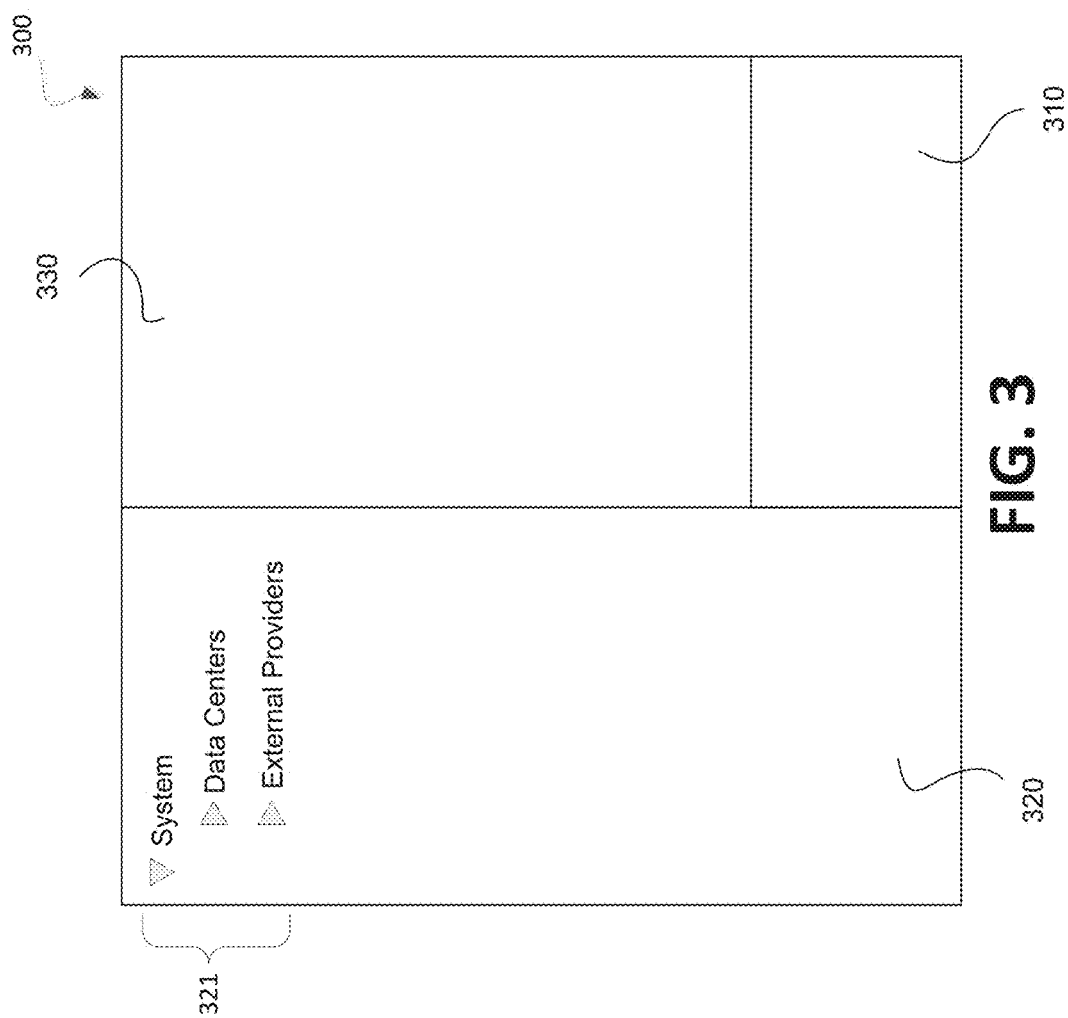
FIG. 3 is an illustrated example graphical user interface in accordance with some embodiments.

FIG. 3 illustrates an example graphical user interface 300 in accordance with some embodiments. The graphical user interface 300 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 300 may be displayed or provided by a navigation module 200 of an administrator system.

As shown in FIG. 3, the graphical user interface 300 may include a navigation tree 321. As an example, the navigation tree 321 may correspond to multiple networks of multiple data centers and external providers. However, the navigation tree 321 of the graphical user interface 300 may correspond to any component or resource of a data center or external provider.

Figure 4:
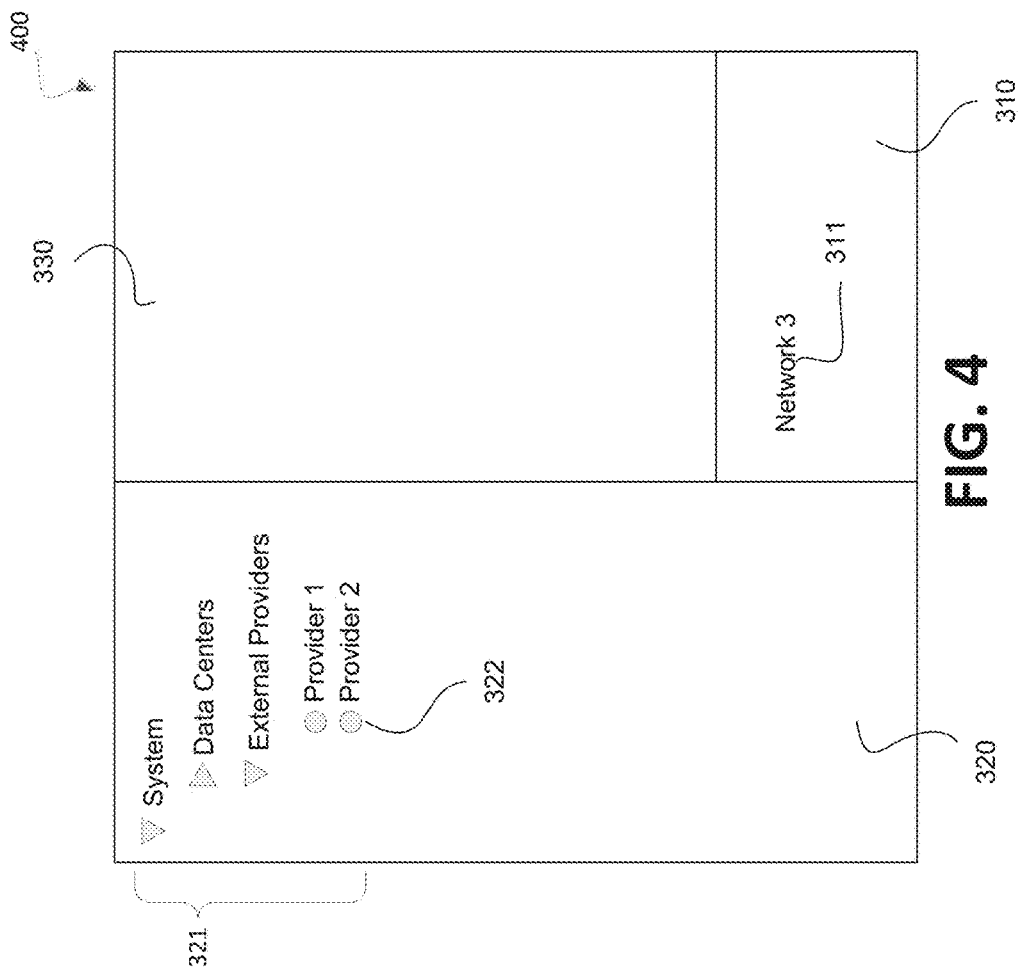
FIG. 4 is an illustrated example of the graphical user interface in response to a user selection in accordance with some embodiments of the disclosure.
Figure 5:
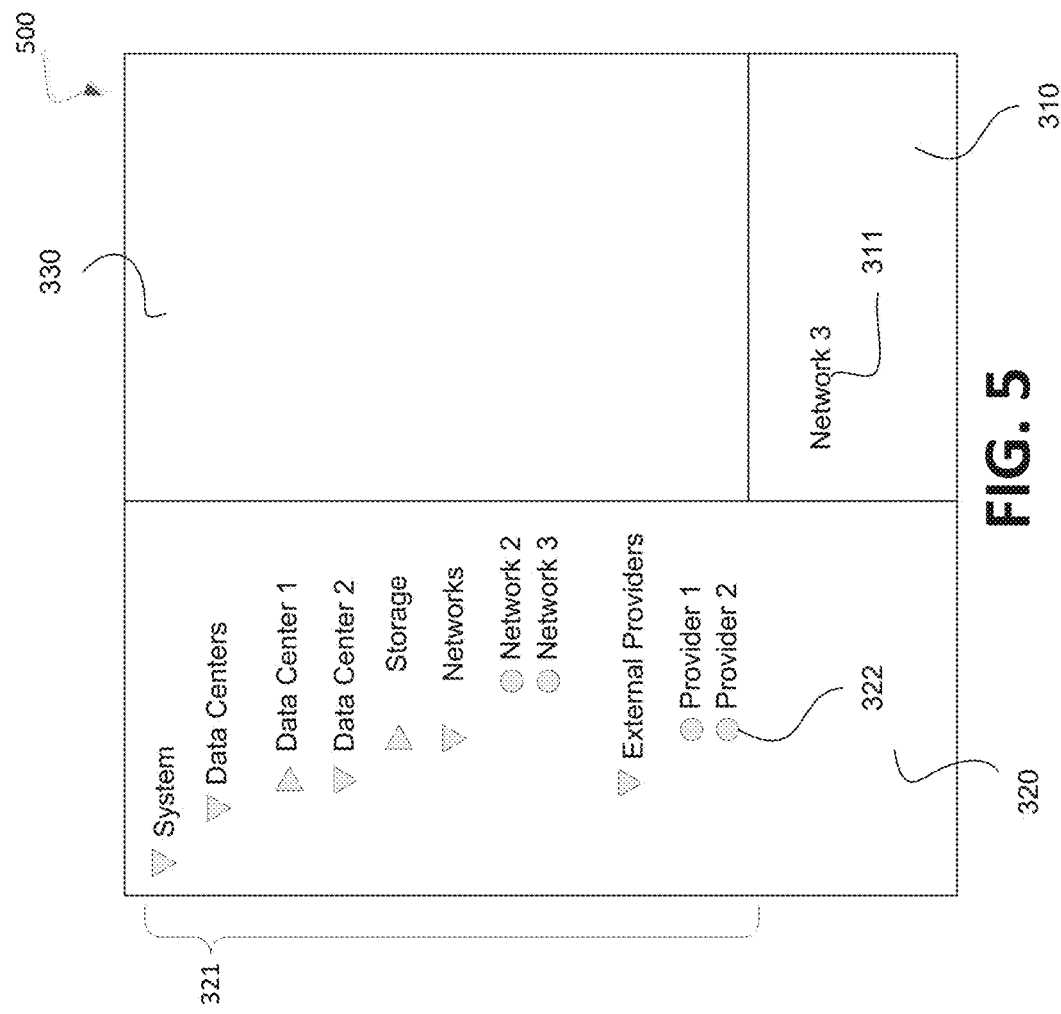
FIG. 5 is an illustrated example of the graphical user interface in response to a user selection of a link in accordance with some embodiments.

The graphical user interface 300 may include a section 310 that may include links as described in further detail with regard to FIGS. 4 and 5. Furthermore, a section 320 may include the navigation tree 321 and a section 330 may include selection information. In some embodiments, the navigation tree 321 may first display a first hierarchical level also referred to as a root level (e.g., the 'System' node) and a second hierarchical level including a node for 'Data Centers.' and a node for 'External Providers.' As such, the navigation tree 321 may be considered to be expanded to the second hierarchical level. Furthermore, the section 320 of the graphical user interface 300 may not display information until an entry or node of the navigation tree 321 is selected.

FIG. 4 illustrates an example graphical user interface 400 in accordance with some embodiments. The graphical user interface 400 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 400 may be displayed or provided by a navigation module 200 of an administrator system. Furthermore, the graphical user interface 400 may correspond to the graphical user interface 300 in response to a user expansion of a portion of the navigation tree 321.

As shown in FIG. 4, a portion of the navigation tree 321 of the graphical user interface 400 may be expanded to display a third hierarchical level. For example, the portion of the navigation tree 321 corresponding to the 'External Providers' node in the second hierarchical level of the navigation tree 321 may be selected by a user and expanded to include a node for a first external provider and a node for a second external provider in a third hierarchical level of the navigation tree 321. As an example, a user may select the node 322 corresponding to the second external provider and the section 330 may display information associated with the second external provider represented by the node 322. Furthermore, the section 310 may include one or more links associated with the second external provider corresponding to the node 322. For example, the section 310 may display a link 311 that represents a network provided by the second external provider.

FIG. 5 illustrates an example graphical user interface 500 in accordance with some embodiments. The graphical user interface 500 may be provided by processing logic that may comprise hardware (e.g., processing device, circuitry, dedicated logic, programmable logic, microcode, etc.), software (e.g., instructions run or executed on a processing device), or a combination thereof. In some embodiments, the graphical user interface 500 may be displayed or provided by a navigation module 200 of an administrator system. Furthermore, the graphical user interface 500 may correspond to the graphical user interface 400 in response to a user selection of a link 311.

As shown in FIG. 5, the navigation tree 321 of the graphical user interface 500 may be expanded to display a further hierarchical level of another portion of the navigation tree 321. For example, in response to a user selection of the link 311 in the section 310, the 'Data Centers' node of the navigation tree 321 may be expanded to display a third hierarchical level including nodes representing multiple data centers and the navigation tree 321 may be further expanded to display a further hierarchical level that includes a node 322 that represents the link 311. For example, as shown, a node corresponding to the second data center may be expanded to display networks organized under the second data center and that includes the third network that corresponds to the link 311.

As such, a navigation tree and a link may be displayed or provided to a user. The link may correspond to a node of the navigation tree. In response to a user selection of the link, the navigation tree may be expanded to display the node corresponding to the link. In some embodiments, the expansion of the navigation tree may result in the display of multiple hierarchical levels that were not previously displayed. For example, the navigation tree may display nodes in a first and second hierarchical level. In response to the user selection of the link, the navigation tree may be further expanded to display nodes in a third hierarchical level and a fourth hierarchical level that includes the node corresponding to the link.

Furthermore, in some embodiments, the section 310 may include a second link that corresponds to another network that is represented by a second node of the navigation tree. If a user selects the second link, the navigation tree may be further expanded again in response to the selection of the second link. For example, the navigation tree may be further expanded to another hierarchical level that displays the second node of the navigation tree.

Figure 6:
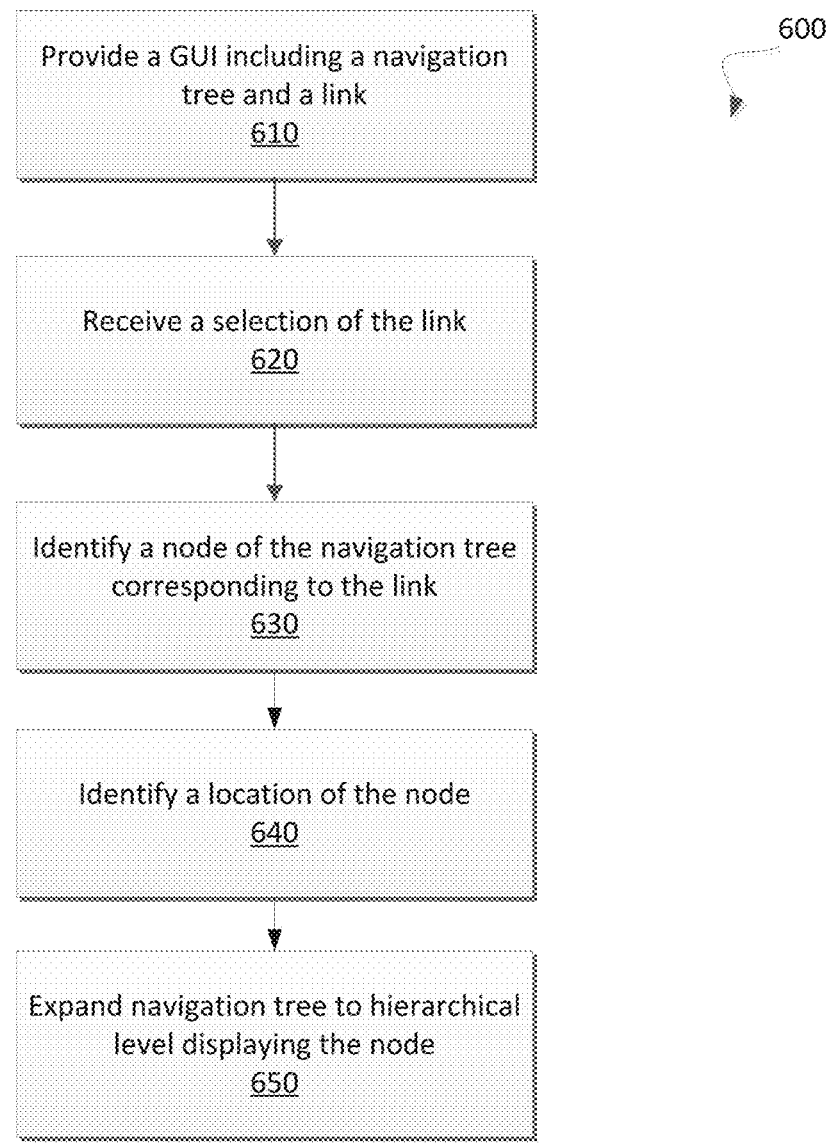
FIG. 6 illustrates an example method to expand a navigation tree in accordance with some embodiments of the disclosure.

FIG. 6 is an example method to expand a portion of a navigation tree in accordance with some embodiments of the disclosure. The method 600 may be provided by processing logic that may comprise hardware (e.g., processing device, circuitry, dedicated logic, programmable logic, microcode, etc.), software (e.g., instructions run or executed on a processing device), or a combination thereof. In some embodiments, the method 600 may be performed by a navigation module 200 of an administrator system.

As shown in FIG. 6, the method 600 may begin with the processing logic displaying or providing a graphical user interface (e.g., graphical user interfaces 300, 400, or 500) including a navigation tree (e.g., navigation tree 321) and a link (e.g., link 311) (block 610). In some embodiments, the navigation tree may include multiple nodes. For example, a first hierarchical level of the navigation tree may include a root node and a second hierarchical level of the navigation tree may include nodes corresponding to data centers. Further hierarchical levels may be included beneath the second hierarchical level, however only the first and second hierarchical levels may be displayed when the graphical user interface is first provided or displayed. The processing logic may further receive a selection of the displayed or provided link (block 620). For example, the processing logic may receive a user selection of the link that corresponds to a network that is included in a data center. Furthermore, the processing logic may identify a node of the navigation tree that corresponds to the link (block 630) and may identify a location of the node in the navigation tree (block 640). For example, the processing logic may identify which hierarchical level of the navigation tree the node is located in as well as under which parent node the node is located. Furthermore, the processing logic may expand the navigation tree to a hierarchical level that displays the node corresponding to the selected link (block 650). For example, the processing logic may expand the navigation tree to the hierarchical level that includes the node in a portion of the navigation tree that includes the parent node.

Figure 7:
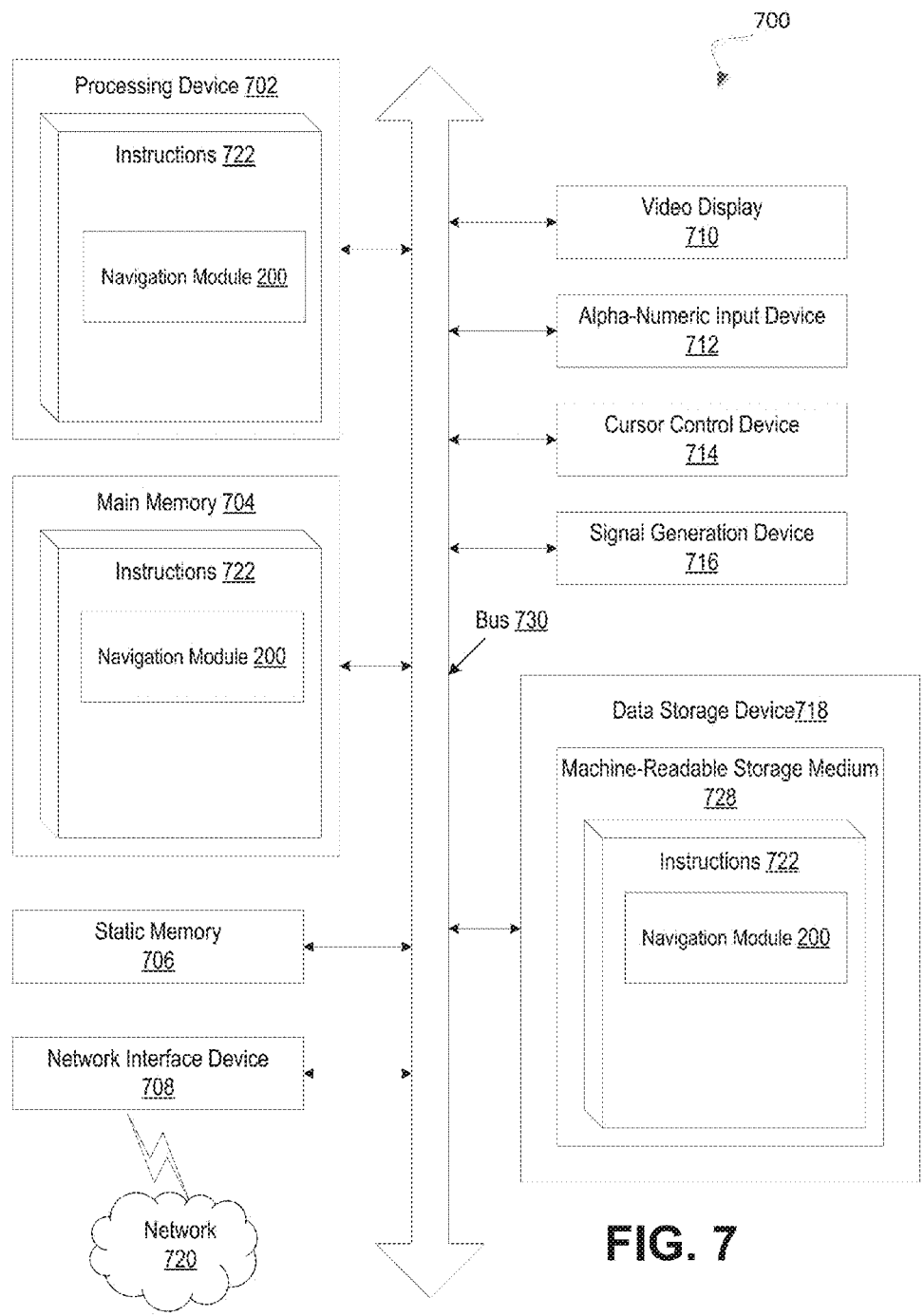
FIG. 7 illustrates a block diagram of an embodiment of a computer system in which some embodiments of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a row module (e.g., navigation module 121 of FIG. 1 and/or navigation module 200 of FIG. 2) and/or a software library containing methods that call modules or sub-modules in a navigation module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    providing, by a processing device, a graphical user interface (GUI) comprising a navigation tree in a first portion of the GUI, wherein the navigation tree comprises a plurality of nodes;
    receiving a selection of a node of the plurality of nodes of the navigation tree that is provided in the first portion of the GUI, the plurality of nodes corresponding to a plurality of components of a data center and an external provider system;
    in response to the selection of the node, providing a plurality of links in a second portion of the GUI, wherein the second portion is a separate display area from the first portion of the GUI comprising the plurality of links identifying each network provided by a particular component of the plurality of components of the data center and the external provider system that corresponds to the selected node, wherein information associated with the external provide system is displayed via the GUI in response to the selection of the node;
    receiving a selection of a first link of the plurality of links in the second portion of the GUI;

expanding the navigation tree in the first portion of the GUI to a hierarchical level displaying another node of the data center corresponding to the selected first link, wherein the expanding of the navigation tree to the hierarchical level displaying the another node corresponding to the selected first link comprises expanding a first hierarchical level of the navigation tree and a second hierarchical level of the navigation tree;

receiving a selection of a second link of the plurality of links in the second portion of the GUI after the selection of the first link;

expanding the navigation tree in the first portion of the GUI to another hierarchical level displaying another node of the external provider system corresponding to the second link, wherein the displaying of another node of the external system provider system is not displayed until the selection of the node of the of the navigation tree is received; and providing a third portion of the GUI being a separate display area from the first portion and the second portion, the third portion displaying a third link associated with the external provider system in response to at least one of the selection of the first link or the selection of the second link, wherein selection of the third link causes expansion of the navigation tree in the first portion of the GUI to a further hierarchical level including a further node representing the third link.

2. The method of claim 1, wherein the expanding of the navigation tree to the hierarchical level displaying the another node corresponding to the selected first link comprises: identifying a parent node of the node corresponding to the selected link.

3. The method of claim 2, wherein a portion of the navigation tree is expanded to the hierarchical level displaying the another node corresponding to the selected first link in view of the parent node.

4. A system, comprising:
a memory; and
a processing device, operatively coupled with the memory, to:
provide a graphical user interface (GUI) comprising a navigation tree in a first portion of the GUI, wherein the navigation tree comprises a plurality of nodes;
receive a selection of a node of the plurality of nodes of the navigation tree that is provided in the first portion of the GUI, the plurality of nodes corresponding to a plurality of components of a data center and an external provider system;
in response to the selection of the node, provide a plurality of links in a second portion of the GUI, wherein the second portion is a separate display area from the first portion of the GUI comprising the plurality of links identifying each network provided by a particular component of the plurality of components of the data center and the external provider system that corresponds to the selected node, wherein information associated with the external provide system is displayed via the GUI in response to the selection of the node;
receive a selection of a link of the plurality of links in the second portion of the GUI; and
expand the navigation tree in the first portion of the GUI to a hierarchical level displaying another node corresponding to the selected first link, wherein the expanding of the navigation tree to the hierarchical level displaying the another node corresponding to the selected first link comprises expanding a first hierarchical level of the navigation tree and a second hierarchical level of the navigation tree;

receive a selection of a second link of the plurality of links in the second portion of the GUI after the selection of the first link;

expand the navigation tree in the first portion of the GUI to another hierarchical level displaying another node of the external provider system corresponding to the second link, wherein the displaying of another node of the external system provider system is not displayed until the selection of the node of the of the navigation tree is received; and provide a third portion of the GUI being a separate display area from the first portion and the second portion, the third portion displaying a third link associated with the external provider system in response to at least one of the selection of the first link or the section of the second link, wherein selection of the third link causes expansion of the navigation tree in the first portion of the GUI to a further hierarchical level including a further node representing the third link.

5. The system of claim 4, wherein to expand the navigation tree to the hierarchical level displaying the another node corresponding to the selected first link, the processing device is further to:
identify a parent node of the another node corresponding to the selected link.

6. The system of claim 5, wherein a portion of the navigation tree is expanded to the hierarchical level displaying the another node corresponding to the selected first link in view of the parent node.

7. A non-transitory machine-readable storage medium comprising data that, when accessed by a processing device, cause the processing device to:
provide a graphical user interface (GUI) comprising a navigation tree in a first portion of the GUI, wherein the navigation tree comprises a plurality of nodes;
receive a selection of a node of the plurality of nodes of the navigation tree that is provided in the first portion of the GUI, the plurality of nodes corresponding to a plurality of components of a data center and an external provider system;
in response to the selection of the node, provide a plurality of links in a second portion of the GUI, wherein the second portion is a separate display area from the first portion of the GUI comprising the plurality of links identifying each network provided by a particular component of the plurality of components of the data center and the external provider system that corresponds to the selected node, wherein information associated with the external provide system is displayed via the GUI in response to the selection of the node;
receive a selection of a link of the plurality of links in the second portion of the GUI; and
expand, by the processing device, the navigation tree in the first portion of the GUI to a hierarchical level displaying another node corresponding to the selected first link, wherein the expanding of the navigation tree to the hierarchical level displaying the another node corresponding to the selected first link comprises expanding a first hierarchical level of the navigation tree and a second hierarchical level of the navigation tree;
receive a selection of a second link of the plurality of links in the second portion of the GUI after the selection of the first link;

expand the navigation tree in the first portion of the GUI to another hierarchical level displaying another node of the external provider system corresponding to the second link, wherein the displaying of another node of the external system provider system is not displayed until the selection of the node of the of the navigation tree is received; and provide a third portion of the GUI being a separate display area from the first portion and the second portion, the third portion displaying a link associated with the external provider system in response to at least one of the selection of the first link or the section of the second link, wherein selection of the third link causes expansion of the navigation tree in the first portion of the GUI to a further hierarchical level including a further node representing the third link.

8. The non-transitory machine-readable storage medium of claim 7, wherein to expand the navigation tree to the hierarchical level displaying the at other node corresponding to the selected first link, the processing device is further to:
identify a parent node of the node corresponding to the selected link.

\* \* \* \* \*